United States Patent [19]

Henrich et al.

[11] 4,038,216
[45] July 26, 1977

[54] MATERIAL AND METHOD OF MAKING SECONDARY-ELECTRON EMITTERS

[75] Inventors: Victor E. Henrich, Newton; John C. C. Fan, Brookline, both of Mass.

[73] Assignee: Massachusetts Institute of Technology, Cambridge, Mass.

[21] Appl. No.: 604,390

[22] Filed: Aug. 13, 1975

Related U.S. Application Data

[63] Continuation-in-part of Ser. No. 482,109, June 24, 1974, abandoned.

[51] Int. Cl.$^2$ .............................................. H01B 1/02
[52] U.S. Cl. ...................................... 252/514; 75/206
[58] Field of Search ................... 252/514, 518; 75/206

[56] References Cited

U.S. PATENT DOCUMENTS 3,069,759   12/1962   Grant et al. ...................... 75/206 X

OTHER PUBLICATIONS

Surface Science, vol. 42, No. 1, Mar., 74, pp. 139–156.

*Primary Examiner*—Benjamin R. Padgett
*Assistant Examiner*—Josephine Lloyd
*Attorney, Agent, or Firm*—Arthur A. Smith, Jr; Martin M. Santa; Robert Shaw

[57] ABSTRACT

Thick, finely-grained films of cermets are fabricated using conventional techniques of sputtering the ceramic and the metal onto a substrate. The cermet is then subjected to differential sputtering in which the metal is sputtered away faster than the ceramic to leave a ceramic-rich surface layer having excellent secondary-electron-emission properties for low-energy incident electrons. Typical of such cermets are MgO/Au, MgO/Pt and MgO/Ag. The presence of metallic particles in the bulk of the films and the small size of the ceramic particles greatly reduce surface charging while allowing the emitter film to be made thick enough to have a long operating life under adverse device conditions.

7 Claims, 2 Drawing Figures

MATERIAL AND METHOD OF MAKING SECONDARY-ELECTRON EMITTERS

BACKGROUND OF THE INVENTION

This application is a continuation-in-part of copending application Ser. No. 482,109 filed June 24, 1974, now abandoned.

The invention herein described was made in the course of work performed under a contract with the Electronic Systems Division, Air Force Systems Command, United States Air Force.

Negative-electron-affinity materials, such as monolayer coatings of cesium on GaP, Si, etc., and thin oxide layers on metallic substrates have proven to be excellent secondary-electron emitters for low-power applications such as electron multipliers. There has been less success, however, in finding good secondary emitters for higher-power devices, where heating and electron or ion bombardment can destroy the surface layers or coatings.

Finely-grained two-component films comprising a high yield material and an electrically conductive material are good candidates for use as secondary-electron emitters, especially in high-power applications.

Briefly, metal oxides such as BeO, MgO and $Al_2O_3$ exhibit some of the highest secondary-electron yields. However, their usefulness as cold cathodes is limited to layers thin enough (usually < 100A) for charge to tunnel from a conducting substrate to neutralize the surface charge produced by the primary electron beam. Such thin layers are unsuitable for high-power applications, in which they would be rapidly damaged by electron or ion bombardment. An alternative approach is to use finely-grained, two-component films comprising a high-yield material and an electrically conductive material. (This type of material is one of a class of materials usually referred to as cermets, and herein we shall refer to it simply as a cermet.) If the grains are small enough (about 100A or less), charge can tunnel or leak from the surface of the insulating grain to adjacent metal particles and then be conducted to a metallic substrate, even for relatively thick films. One such cermet system, $Al_2O_3$/Mo, has been investigated previously as a secondary-electron emitter, but problems were encountered with multiple chemical phases, and its secondary-electron yield was only four with a crossover energy no lower than 40 volts. The phenomenon of differential sputtering to be described below, was not investigated in this material.

It is therefore an object of this invention to provide a high-efficiency secondary-emitter which will be useful in devices where heating or electron- or ion-bombardment rapidly destroy conventional emitters.

It is therefore another object of this invention to provide thick film cermets having long life, high-efficiency secondary-electron emission and low crossover energy.

SUMMARY OF THE INVENTION

Efficient secondary-electron emitters have been obtained by using rf sputtering to co-deposit a high-yield insulator (e.g., MgO) and a metal (Au, Ag, Pt, etc.) in the form of thick, finely grained cermet films followed by differential sputtering of the film surface. The small size of the secondary-electron-emitting particles and the presence of a metallic component permit the removal of surface charge even from relatively thick films. The secondary-emission characteristics of the films depend on the extent of differential sputtering. For example, MgO/Au cermet films consist of MgO and Au crystallites, and Au is removed more rapidly than MgO by sputtering, leaving a thin surface layer that is MgO-rich. The secondary-electron emission of these differentially-sputtered films is determined mainly by the MgO-rich surface layer and hence has high yields and low crossover energies, while the amount of surface charging that occurs depends on the amount of metallic component in the bulk of the films, permitting them to be made much thicker than most other types of secondary emitters. Differential sputtering is smaller in the MgO/Ag system, which also consists of insulator and metal crystallites, but relatively high yields and low crossover energies are still obtained. Differential sputtering of the MgO/Pt system also produces an MgO enriched surface of the same character as that obtained for the MgO/Au and MgO/Ag systems and results in a secondary emitter having relative high yields and low crossover energies. These films are very efficient secondary-electron emitters, with MgO/Au films being comparable to oxidized BeCu. They promise to be useful for electron-multiplication applications where severe ion or electron bombardment is present.

DETAILED DESCRIPTION OF THE INVENTION

Figure 1:
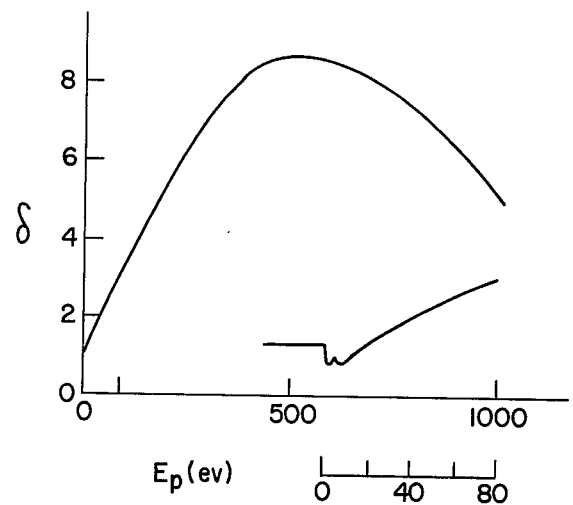
FIG. 1 is a graph of secondary-electron yield as a function of primary-electron energy for a differentially-sputtered MgO/Au film of 70 vol % MgO.

Finely-grained cermet films were prepared by rf diode sputtering from pressed composite targets. The sputtering apparatus is a conventional commercial unit. The vacuum pumping system, which consists of a turbomolecular pump and a liquid nitrogen cold trap, gives a base pressure of $5 \times 10^{-7}$ Torr. Sputtering was performed at 13.56 MHz in Ti-purified Ar gas at $7 \times 10^{-3}$ Torr ($N_2$ equivalent). The self-biased dc voltage was $-2500V$. The deposition rate was 5–10A/min.

Sputtering targets 3.7 cm in diameter were cold-pressed under a uniaxial pressure of about 2 kbar from mixtures of $-100$ mesh MgO powder and either $-325$ mesh Au, $-200$ mesh Ag, $-400$ mesh Ni powder and 325 mesh Pt. The mesh size is not critical. The target-to-substrate distance was 5 cm. Polished stainless steel substrates (1 μm diamond paste was used for the final polish) were used for secondary-electron emission measurements, while carbon substrates (carbon films 150A thick deposited on 200-mesh copper grid) were used for transmission-electron microscopy. Some films were deposited on fused silica substrates for resistance measurements. The substrate material is not critical and may be determined by the device in which the film is to be used.

The substrates were mounted on a stainless steel platform in the sputtering unit. For substrate temperatures below 100°C, the platform was water-cooled, and indium foil was placed between the substrate and the platform for better thermal contact. For higher substrate temperatures, the platform was radiatively heated. The substrate temperature was measured with a chromelalumel thermocouple clamped to the substrate surface. For MgO/Au films the substrate temperature was varied between 50° and 340°C, while for the other cermet systems this temperature was kept below 100°C.

PROPERTIES OF MgO/Au

A. 50 vol % MgO

Films were grown from a target of this composition at substrate temperatures between 50° and 540°C. [Except for 90 vol % MgO/Au films, the actual bulk composition of a film was within several percent of the composition of the target.] There was no appreciable influence of temperature on micro-crystallite structure or secondary-electron-emission properties. Transmission-electron-diffraction patterns show the presence of sharp diffraction rings indicating that the films are polycrystalline, and the lattice spacings determined from the locations of the rings show it to be a two-phase mixture of MgO and Au. In all films, the MgO and Au particles are about the same size. The average particle size is 50-100A, with some crystallites as small as 10 to 15A. These particles are thus small enough to allow charge to tunnel or leak from the surface of the insulating grains to the surrounding metal, and yet the insulating regions are large enough so that they have secondary-electron-emission characteristics close to those of bulk MgO.

In discussing the secondary-electron-emission properties of cermet films, we will refer to two main features in the yield curve: the crossover energy $E_c$ and the peak yield $\delta_{max}$. The crossover energy is the primary-electron energy for which the quantum yield is one. For device applications, $E_c$ should be as low as possible so that quantum gain can be achieved for low-energy primary electrons. For 50 vol % MgO samples, the secondary-electron-emission characteristics are quite insensitive to substrate temperature. (This is also true for other compositions.) After the film surface is differentially sputtered by 500 eV Arion bombardment, $E_c$ is usually between 30 and 40 eV and $\delta_{max}$ is 4 to 5. (For comparison, the values for bulk MgO are $E_c \approx$ 13 eV and $\delta_{max} =$ 10-20.) The yield of these cermet films is lower than that of oxidized BeCu—the most widely-used low-power secondary-electron emitter-which has $E_c \approx 13$ eV and $\delta_{max} \approx 10$. However, the active region of BeCu emitters is a BeO film 100A thick or less, which is easily damaged by intense ion or electron bombardment. Cermet secondary-emitters can be much thicker; we have observed no significant charging on 3000A thick films of 50 vol % MgO/Au. Thick cermet films should have long operating lives in high-power device applications and yet their yields are substantially better than that of Pt, commonly used for such purposes, for which $\delta_{max}$ is only 2 and $E_c$ is about 130 eV.

We have found that Ar-ion bombardment of MgO/Au films removes Au faster than MgO. Presumably this is due to the fact that the sputtering rate of bulk Au for 500 eV Ar ions is six times faster than that of MgO and that the cermet films consist of discrete Au and MgO particles. Differential sputtering leaves a MgO-rich surface layer estimated to be about 10-20A thick, without affecting the composition of the bulk of the film. For primary-electron energies up to several hundred volts, most of the secondary electrons originate within a region of comparable thickness, and we have found that the yields of these MgO/Au films do indeed correlate well with the surface MgO composition measured by Auger spectroscopy. All subsequent discussions of secondary-electron-emission properties of cermet films will refer to samples that have been differentially sputtered by Ar-ion bombardment.

B. Other MgO/Au Compositions

Films have been prepared from targets containing 70, 80 and 90 vol % MgO. The electron-microscopic studies show that the 70 and 80 vol % MgO films consist of small crystallites of MgO and Au. The Au particles are about the same size as in 50 vol % films, while the MgO particles become progressively larger (up to 200A for 80 vol % MgO). For 90 vol % MgO films, only MgO diffraction rings are visible, and Auger spectroscopy of the asdeposited surfaces shows only about 1 vol % Au. However, only slight surface charging is seen on 400A thick films of 90 vol % MgO, which appears to indicate that more than 1 vol % Au is present in the bulk. The fraction of Au crystallites observed in transmission-electron micrographs also appears to be greater than 1%.

For 70 vol % MgO, no significant surface charging was observed even for films 3000A thick. Peak yields of 8 and $E_c$ values as low as 17 eV were obtained after differential sputtering by Ar-ion bombardment. FIG. 1 shows the yield for such a film. The 80 and 90 vol % MgO films have progressively better secondary-electron yields. In fact, a 400A film prepared for a target of 90 vol % MgO has a $\delta_{max}$ of almost 10 and an $E_c$ of 13 eV, as good as oxidized BeCu (although significant charging occurs when films of this MgO content are made much thicker than 400A).

Figure 2:
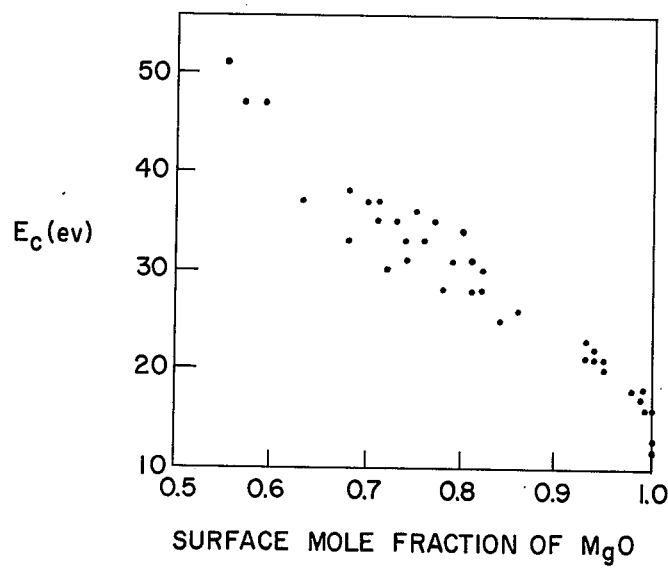
FIG. 2 is a graph showing crossover energy as a function of surface mole fraction of MgO in differentially sputtered MgO/Au films.

By using Auger spectroscopy, we have quantitatively determined the surface composition of the samples after differential sputtering by argon-ion bombardment. Since the Auger electrons originate from no more than 20A into the sample, we are only seeing the concentration in this region. The surface composition changes during the first few minutes of ion bombardment, but it then reaches a value that is stable under further bombardment. FIG. 2 shows the dependence of $E_c$ on surface MgO content for samples of different bulk concentrations after differential sputtering. The good correlation of $E_c$ and surface MgO content indicates that the thin layer produced by differential sputtering dominates the secondary-electron-emission properties.

PROPERTIES OF MgO/Ag, MgO/Ni AND MgO/Pt

Since bulk Ag sputters about 30% faster than Au, larger differential-sputtering effects might be expected for MgO/Ag films than for MgO/Au films. For the same MgO concentration, Ar-ion bombardment would then produce a higher MgO surface concentration for MgO/Ag films, with a corresponding increase in secondary-electron yield. To investigate this possibility, MgO/Ag films were prepared from 70 and 90 vol % MgO targets. Transmission-electron-diffraction patterns shows these films to consist of crystallite MgO and Ag. From transmission-electron micrographs on 70 vol % MgO samples, the Ag particles appeared to be small (less than 50A). The MgO particles were somewhat larger (up to 150A).

It was found by Auger-electron spectroscopy that the asgrown surfaces of the MgO/Ag films have compositions close to those of the sputtering targets, but that differential sputtering effects are actually smaller than for MgO/Au, resulting in less enrichment of MgO in the surface layer. This indicates that the relative sputtering rates for Ag and MgO in the films are different from those in material bulk, perhaps because the interaction between the two components is stronger in MgO/Ag than in MgO/Au. The dependence of secondary-electron yield on surface MgO concentration was about the same for MgO/Ag as for MgO/Au, although the crossover energies for MgO/Ag films were slightly lower. Because of the reduced differential sputtering in MgO/Ag, the peak secondary-electron yields were smaller than those of MgO/Au films of comparable bulk concentrations. For instance, for a 500A Mgo/Ag film made from a target of 90 vol % MgO, $\delta_{max}$ was 7 and $E_c$ was 11 eV, compared with a $\delta_{max}$ of 10 and $E_c$ of 13 eV for $\delta$ MgO/Au film prepared from a target with the same MgO content.

We have also investigated the MgO/Ni system where the bulk sputtering rate of Ni is only three times larger than that of MgO. For this system, 70, 85 and 95 vol % MgO films were prepared. The differential-sputtering effects turn out to be anomalous, however, with a slight increase in Ni surface concentration after Ar-ion sputtering, contrary to what would be expected from the bulk sputtering rates of MgO and Ni. This might be due to a strong interaction between the components in this system.

As in the case of MgO/Au and MgO/Ag, the secondary-electron-emission properties of MgO/Ni films correlate with the surface MgO concentration. The secondary-electron yield, although lower than in the other two systems, is still respectable. Values of $\delta_{max} = 3.5$ and $E_c = 30$ eV were obtained from an 85 vol % MgO sample 2500A thick, with no significant surface charging.

The cermet system MgO/Pt is also an effective secondary-electron emitter. The bulk sputtering rate of Pt is 3.5 times larger than MgO, resulting in an MgO-enriched surface upon ion bombardment. Bulk compositions varying from 50–90% MgO yield values of $\delta_{max}$ between 3 and 9. The MgO/Pt cermet is prepared in the same manner and under the same substrate conditions as for MgO/Au. As with MgO/Au films at least up to 3000A thick can be made from MgO/Pt with 80 vol. % MgO without significant surface charging. The average size of the MgO particles is 100A across.

Although the cermet materials of the invention have been described as being formed by being sputtered from a starting material which was a mixture of ceramic and metal, it will be apparent to those skilled in the art that the cermet may be formed by sputtering or evaporating from separate sources of ceramic and metal, by evaporation from a composite source, by combining very fine powders of the components, or by any other method that will produce a finely-grained cermet. It will also be apparent that sputtering may be accomplished with gases other than the Ar used in the examples. Other inert gases (e.g., Xe, Ne, $N_2$, etc.) could be used, or the oxide component could be formed by reactive sputtering (or reactive evaporation) from a metal target, e.g., $O_2$ gas and a Mg target would produce MgO.

Although Ar was used for differential sputtering in the examples above, published data indicate that sputtering with other gases would give similar results. It should also be observed that, since the differentially-sputtered surface layer is stable under further ion-bombardment, the film can be continually sputtered, as when used in a gassy tube, and yet stable secondary emission with high yield and low crossover energy can be maintained. It should also be recognized that the initial differential sputtering could be accomplished during the initial operation of a gassy tube Although the examples of suitable cermets have used MgO as the insulating metal oxide, it is known that large secondary-electron yields are obtained from other insulating metal oxides such as BeO and $Al_2O_3$. It is therefore intended to include metallic oxide and other materials having good secondary emission properties as the high-yield constituents of a cermet. There is also considerable latitude in choosing the metallic component of the cermet, as long as it forms conducting paths in the bulk of the film and sputters more readily than the ceramic component. Metals such as Au, Ag, Ni, Pt, W etc. should all be potentially useful. Differential sputtering should produce high efficiency, long-life secondary emitter films from these materials as well as the MgO systems described herein.

The substrate on which the cermet is deposited can be chosen to meet the needs of a particular application. When surface charging must be a minimum, conducting substrates (e.g., steel, Au, Ag, Ni, W, Cu, Mo, etc.) would be preferred, but insulating substrates such as glass or quartz can and have been used successfully.

What is claimed is:

1. A fine-grain layer of material comprising a mixture at least 50 vol % of grains of the high-yield secondary-electron emitting material MgO and grains of an electrically conductive material selected from the group consisting of Au, Ag and Pt, the composition of said layer having a greater ratio of said emitting material to said conductive material at the surface of the layer than in the bulk of the layer, the size of the grains of the emitting material is less than 200A and the conducting material of average size of 50–100 A are small enough to allow charge to tunnel from the surface of the grains of emitting material to the surrounding grains of conductive material and the grains of emitting material are large enough so that the emitting material has secondary-electron-emission characteristics close to that of the emitting material in the bulk.

2. A secondary-electron-emitting cermet film consisting of a mixture of particles of MgO and of Au wherein the film consists of 50 to 90 vol % MgO and wherein the average size of the particles of MgO is 150A or less and wherein the average size of the particles of Au is 100 A or less to allow charge to tunnel from the surface of the MgO grains to the surrounding grains Au to eliminate surface charging of the MgO.

3. The cermet film of claim 2 wherein the surface of the cermet film has a composition of 70 to 100 vol % MgO in order to obtain secondary-electron-emission yields closer to the yield of the pure MgO than would have occurred if the surface composition were the same as that of the bulk.

4. A secondary-electron-emitting cermet film consisting of a mixture of particles of MgO and of Ag, wherein the film consists of 50 to 90 vol % MgO and wherein the average size of the particles of MgO is 150A or less the average size of the Ag particles is less than 50 A to allow charge to tunnel from the surface of the MgO grains to the surrounding grains Ag to eliminate surface charging of the MgO.

5. The cermet film of claim 4 wherein the surface of the cermet film has a composition of 70 to 100 vol % MgO in order to obtain secondary-electron-emission yields closer to the yield of the pure MgO than would have occurred if the surface composition were the same as that of the bulk.

6. A secondary-electron emitting cermet film consisting of a mixture of particles of MgO and of Pt wherein the film consists of 50 to 90 vol % MgO and wherein the average size of the particles of MgO and Pt is 100 A or less to allow charge to tunnel from the surface of the MgO grains to the surrounding grains Pt to eliminate surface charging of the MgO.

7. The cermet film of claim 6 wherein the surface of the cermet film has a composition of 70 to 100 vol % MgO in order to obtain secondary-electron-emission yields closer to the yield of the pure MgO than would have occurred if the surface composition were the same as that of the bulk.

* * * * *